US005112436A

United States Patent [19]

Bol

[11] Patent Number: 5,112,436

[45] Date of Patent: May 12, 1992

[54] METHOD OF FORMING PLANAR VACUUM MICROELECTRONIC DEVICES WITH SELF ALIGNED ANODE

[75] Inventor: Igor I. Bol, Sherman Oaks, Calif.

[73] Assignee: Xerox Corporation, Stamford, Conn.

[21] Appl. No.: 632,870

[22] Filed: Dec. 24, 1990

[51] Int. Cl.[5] .......................... B44C 1/22; C23F 1/02; C03C 15/00; C03C 25/06

[52] U.S. Cl. .................................... 156/643; 156/653; 156/656; 156/657; 156/659.1; 156/662

[58] Field of Search ............... 156/643, 644, 650, 651, 156/652, 653, 656, 657, 659.1, 662; 437/41, 61, 42, 50, 189, 192, 228, 238, 241, 245; 357/65, 71

[56] References Cited

PUBLICATIONS

Brodie, Ivor, "Physical Considerations in Vacuum Microelectronics Devices," IEEE Transactions on Electron Devices, vol. 36, No. 11, Nov. 1989, 2641-2644.

Busta, H. H., J. E. Pogemiller and M. F. Roth, "Lateral Miniaturized Vacuum Devices," IEDM, 1989, 533-536.

*Primary Examiner*—William A. Powell

*Attorney, Agent, or Firm*—Daniel J. O'Neill

[57] ABSTRACT

A method for forming on a substrate a microelectronic device having a first and second element. According to the method, a first conductive layer is deposited on the surface. Next, a cap material is deposited, then the first element and a first element cap are formed from the first conductive layer and the cap material respectively. A sacrificial material is conformally deposited, then a second conductive layer is conformally deposited. The second conductive layer is anisotropically etched to form the second element. Finally, the sacrificial material is anisotropically etched.

3 Claims, 2 Drawing Sheets

METHOD OF FORMING PLANAR VACUUM MICROELECTRONIC DEVICES WITH SELF ALIGNED ANODE

Figure 1A:
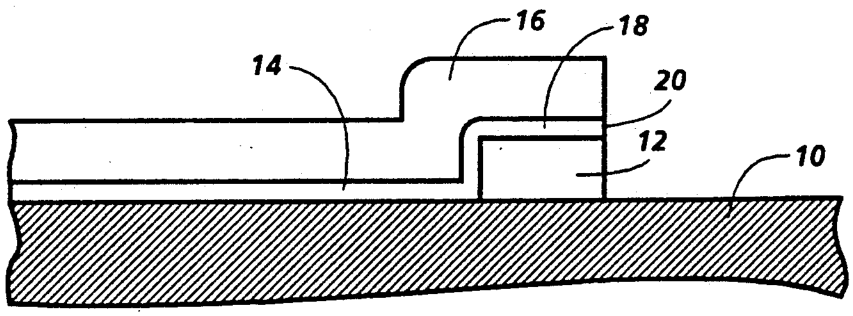

This invention relates to microelectronic devices, and more particularly to a method of forming a vacuum microelectronic device with a self aligned, closely spaced elements.

A promising technology for use in high speed electronic systems is the vacuum microelectronic device, which in essence is a miniature vacuum tube that uses a cold emitter. One type of vacuum microelectronic device uses a field effect emitter in which electrons tunnel through the vacuum energy barrier whose width is determined by the electric field. For significant electron tunneling to take place at the tip of the emitter, the electric field at the tip much reach a relatively high strength (e.g., $1\times10^7$ V/cm). To achieve such a high electric field, the emitters are provided with a relatively sharp tip(e.g., the point of a wedge, cone or pyramid shape). Moreover, the emitter is placed relatively close to the extraction electrode. The closer gap between emitter and extraction electrode, the lower the voltage needed to produce the requisite electric field strength. Moreover, the closer the spacing, the less stringent the requirement for a vacuum. These considerations are discussed in detail in a journal article entitled, "Physical Considerations in Vacuum Microelectronics Devices," Electron Devices, IEEE, Nov. 1989, Vol. 36, No. 11, p. 2641.

One practical method of fabricating vacuum microelectronic devices is micromachining a substrate (e.g., silicon or ceramic). For example, a journal article, "Lateral Miniaturized Vacuum Devices," IEDM 89-533, describes a process for fabricating a vacuum triode on a silicon substrate. In particular, the emitter is placed relatively close to the extraction electrode by fabricating the electrode above a portion of the emitter, separated from the emitter by a sacrificial layer that is later removed. The collector and emitter are positioned by patterning (e.g., photolithography) and etching techniques.

At present, very advanced patterning and etching techniques, such as those used in VLSI fabrication, have a resolution no lower than about 0.5 micron, with patterning and alignment tolerances of about 0.2 micron. However, practical vacuum microelectronic devices require a closer spacing and better control of it.

The present invention is directed to a method for forming planar microelectronic devices, with the device's including elements made from the same or from different materials, and with the devices capable of being fabricated with gaps between elements of extremely small dimensions, down to hundreds of angstoms. A layer of the first sacrificial material is deposited and patterned (to suspend the tip of the cathode). A thin conductive layer (cathode) is deposited and capped by another sacrificial layer of the same material as the first sacrificial layer. These two sandwiched layers are now patterned with two sequencial masks to form the cathode and its tip. A layer of another sacrificial material of predetermined thickness is deposited on the top of the structure using a method of conformal deposition. The thickness of this material defines the gap between the cathode's tip and the self aligned anode. In this manner, there are formed vertical walls of sacrificial material alongside the vertical walls of the first element and its cap, with the sacrificial material walls having a lateral thickness equal to the thickness of the deposited sacrificial material.

Next, a second conductive layer is deposited using a conformal deposition. In this manner, there are formed vertical walls of second conductive material alongside the vertical walls of the sacrificial material, on the opposite side of these walls from the vertical walls of the first element and its cap. The second conductive layer is then etched anisotropically to form a so called spacer or stinger along the second sacrificial layer across the cathode's tip. The second sacrificial material is anisotropically etched, thereby removing the sacrificial material walls between the first element and the second element. An oxide layer is deposited and patterned to anchor interconnect metal to the substrate. The interconnect metal is deposited and patterned. Finally the first sacrificial layer (oxide) is removed (e.g., etched or wased out).

Other aspects of the invention will become apparent from the following description with reference to the drawings, wherein:

FIGS. 1A-4A are cross-sectional views of various stages in forming a vacuum diode according to the method of the present invention; and FIGS. 1B-4B are top views of various stages in forming a vacuum diode according to the method of the current invention.

Figure 1B:
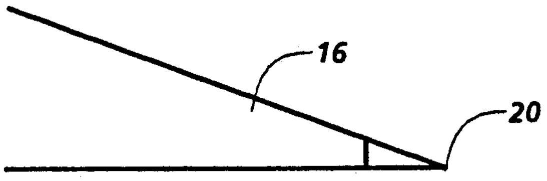

Referring now to FIGS. 1A and 1B, there are shown cross-sectional and top views, respectively, of a substrate 10 on which a ramp 12 has been formed by depositing about 2000 angstroms of silicon dioxide, then patterning and etching the oxide. Substrate 10 can be made of ceramic, or be a silicon substrate preferably covered by an insulating layer, such as silicon nitride. Next, a conductive layer (e.g., a layer of about 500 angstrom thick tungsten) that will form cathode 14 is deposited, followed by deposition of a layer of material (e.g., a layer of about 2000 angstrom thick silicon dioxide) that will form cathode cap 16. The cathode cap 16 material is patterned and then etched together with underlying portions of the cathode 14 material and the ramp 12 material to form cathode cap 16, cathode 14, and ramp 12, respectively. Ramp 12 elevates the portion 18 of cathode 14 which overlies ramp 12. Elevating cathode portion 18 aids in the ballistic transport of electrons. It is important that one corner 20 of cathode portion 18 be relatively sharp in order to concentrate the electric field lines. To obtain a sharp corner 20, it is well known to one skilled in the art to perform the above step of patterning the cathode cap 16 material using a two masking process.

Figure 2A:
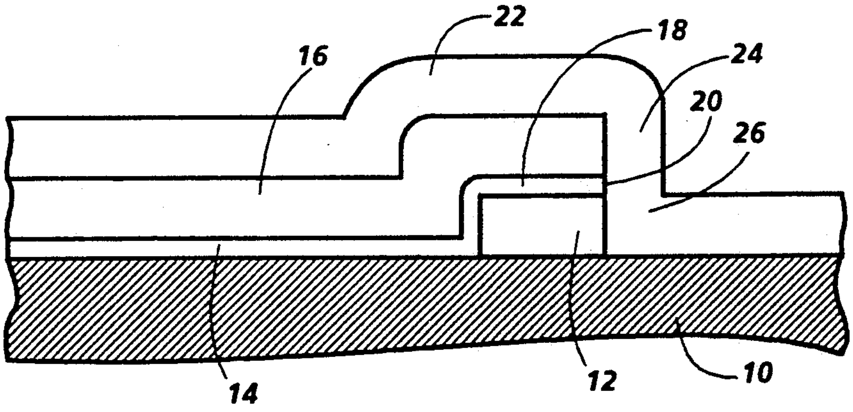
Figure 2B:
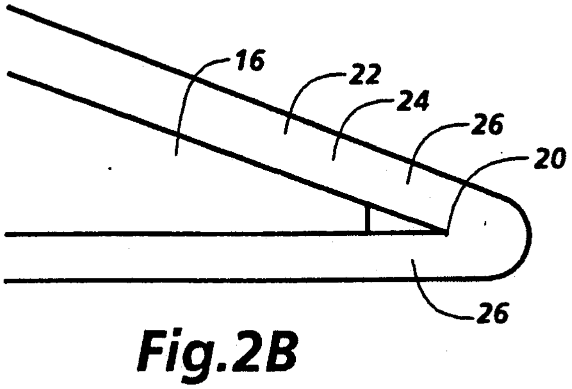

Referring now to FIGS. 2A and 2B, a sacrificial layer 22 of silicon nitride, 2000 angstroms thick, is next deposited using a conformal deposition technique, such as CVD. In this manner, in effect a vertical wall 24 of silicon nitride is formed along the sides of the raised structures on substrate 10, with the portion 26 of the nitride wall 24 having greatest height being found alongside cathode portion 18. Moreover, since the deposition was conformal, the nitride wall 24 will have a thickness substantially equal to the thickness of the nitride deposition. Note that the height of nitride wall portion 26 is a function of not only the nitride thickness but of the thicknesses of the ramp 12, cathode 14, and cathode cap 16, with the thickness of cathode cap 16 being the likely candidate for adjusting the height of nitride wall portion 26.

Figure 3A:
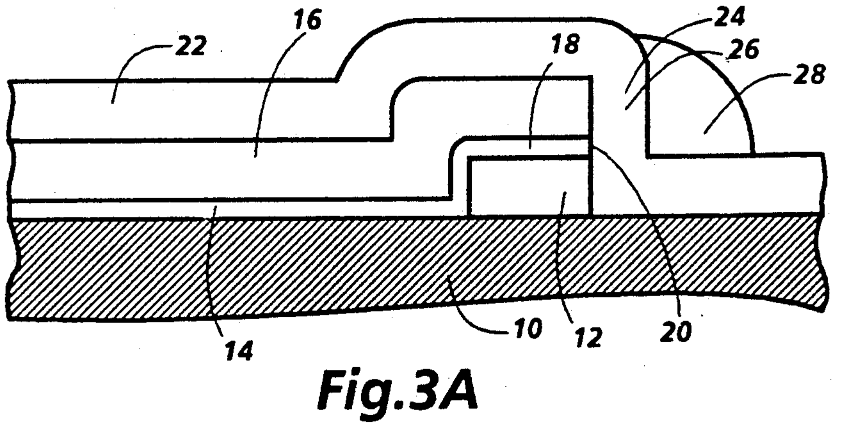
Figure 3B:
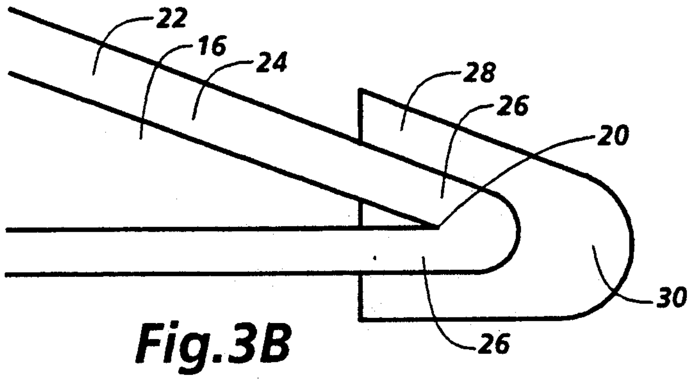

Referring now to FIGS. 3A and 3B, anode 28 is formed by a technique similar to the side wall spacer technique employed in the fabrication of certain MOS transistors. A conductive layer, such as a 5000 angstroms thick layer of polycide, that will form anode 28 is deposited using a conformal deposition technique (e.g., CVD). Here, as with the conformal deposition of the sacrificial material, in effect there is formed a vertical wall of the anode 28 material along the sides of the raised structures on substrate 10. The polycide is then anisotropically etched to an extent sufficient to remove the polycide from all areas except near the highest portion 26 of the nitride wall 24. In this manner, node 28 is formed. In the course of the anistropic etch, the side 30 of anode 28 exterior to nitride wall portion 26 will become rounded since it is not shielded by nitride wall portion 26.

Figure 4A:
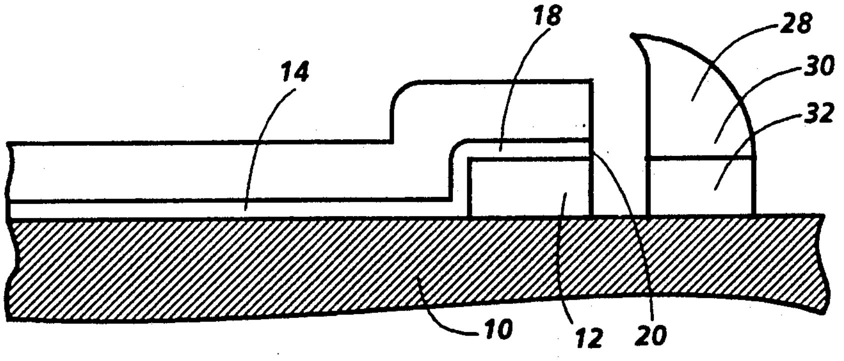
Figure 4B:
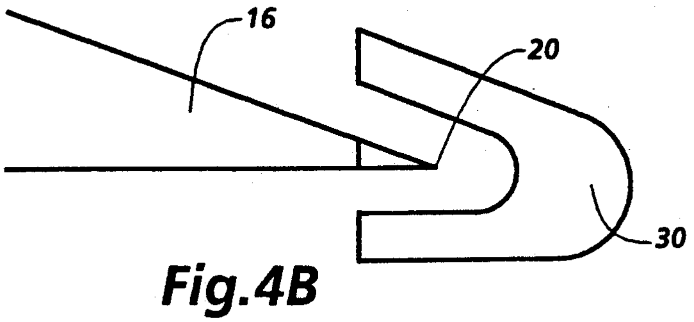

Referring now to FIGS. 4A and 4B, sacrificial layer 22 is etched using a technique that only removes the portion of the layer that is not covered by anode 28. For example, the silicon nitride sacrificial layer 22 is removed using a plasma etch. In this manner, the nitride wall portion 26 between the anode 28 and the cathode portion 16 is removed, while a portion 32 of nitride remains to support and elevate anode 28 to a position substantiall level with raised cathode portion 18.

Next, a passivation layer of silicon dioxide is deposited, patterned and etched to form contact and anchor widows, and a layer of interconnect metal (e.g., aluminum) is deposited, patterned and etched to form interconnects to the anode 28 and to cathode 14, with the interconnects contacting the anode 28 and cathode 14 through the contact windows. Finally, an isotropic etch, such as a wet oxide etch, is used to remove ramp 12 and cathode cap 16.

With the above invention, the gap between elements is defined by the thickness of the deposition of a sacrificial material, rather than by patterning and etching. Consequently, the method of the invention allows much smaller gaps between elements.

While the invention has been described with reference to the structures disclosed, it is not confined to the specific details set forth, but is intended to cover such modifications or changes as may come within the scope of the following claims.

I claim:

1. A method for forming on a substrate a microelectronic device having a first and a second element, comprising the steps of:

a. depositing a first conductive layer on said substrate;
b. depositing a cap material;
c. forming said first element and the first element cap from said first conductive layer and said cap material, respectively;
d. conformally depositing a sacrificial material;
e. conformally depositing a second conductive layer;
f. anisotropically etching said second conductive layer to form said second element; and
g. anisotropically etching said sacrificial material.

2. A method for forming on a substrate a microelectronic device having a first and a second element comprising the steps of:

a. depositing a first sacrificial layer on said substrate;
b. forming a ramp structure from said first sacrificial layer;
c. depositing a first conductive layer on said substrate;
d. depositing a cap material;
e. forming said first element and the first element cap from said first conductive layer and said cap material, respectively;
f. conformally depositing a second sacrificial material;
f. conformally depositing a second conductive layer;
g. anisotropically etching said second conductive layer to form said second element; and
h. anisotropically etching said second sacrificial material.

3. The method according to claim 2, including the step of removing said first sacrificial material.

* * * * *